3,459,809
METHOD OF PRODUCING MERCAPTANS
Shiro Ishida and Tokiyuki Yoshida, Amagasaki, Japan, assignors to Nippon Oil and Fats Company Limited, Tokyo, Japan
No Drawing. Filed Dec. 23, 1966, Ser. No. 604,196
Claims priority, application Japan, Jan. 14, 1966, 41/1,803
Int. Cl. C07c *149/12*
U.S. Cl. 260—609     8 Claims

ABSTRACT OF THE DISCLOSURE

A method of producing a mercaptan by reacting hydrogen sulfide with an aliphatic olefin in an anhydrous liquid phase in the presence of a peroxyester having the formula

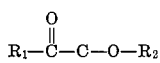

in which $R_1$ is a member selected from the group consisting of alkyls of 1–10 carbon atoms and benzyl, and $R_2$ is t-butyl.

---

The present invention relates to a method of producing primary or secondary mercaptans by adding hydrogen sulfide directly to olefins using organic peroxyesters as a catalyst.

The previous methods of synthesizing mercaptans by radical addition of hydrogen sulfide to olefins include a process for using $\alpha,\alpha'$-azodiisobutyronitrile or di-t-butylperoxide together with water (U.S. Patent No. 2,865,965 (1958)); a process for using anhydrous ferric chloride together with cumenehydroperoxide or methylethylketone peroxide (U.S. Patent No. 2,925,443 (1960)); a process for using di-t-butylperoxide and metal powder (U.S. Patent No. 3,045,053 (1962)); and a process for using azonitrile as catalysts. These processes, however, give low yields and those employing organic peroxides have the further disadvantage of requiring other reaction additives.

The present invention consists in a method of producing mercaptans by adding hydrogen sulfide to an aliphatic olefin characterized in that the addition is effected in the presence of a peroxyester having the general formula

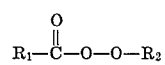

wherein $R_1$ is a member selected from the group consisting of alkyls of 1–10 carbons and benzyl, and $R_2$ is t-butyl; said addition being conducted in an anhydrous liquid phase.

An object of the present invention is to provide an advantageous method of producing mercaptans wherein the reaction is effected in an anhydrous liquid phase to produce mercaptans always in a higher yield than by-product sulfides. Non-reacted hydrogen sulfide is recovered by difference of temperature between a recovery bomb, recovered hydrogen sulfide being recycled.

The olefins employed in the process of this invention are aliphatic olefins of 3–50 carbon atoms, preferably having terminal unsaturation such as propylene, pentene, 1-octene, diisobutylene, 1-decene, 1-dodecene, 1-tetradecene, 1-pentadecene, 1-hexadecene, 1-octadecene, tetracontene etc.

As the peroxyester, mention may be made of t-butyl-peroxypivalate, t-butyl-peroxyisobutylate, t-butyl-peroxylaurate, and t-butyl-peroxybenzoate.

The above-described peroxyesters are added in an amount of 1 to 10% by weight based on the starting olefins, preferably 2 to 5% by weight. In less than 1%, the activity of catalyst is poor and in more than 10% the yield of by-product disulfide increases.

The mole ratio of hydrogen sulfide to olefin is preferably about 4/1 to 15/1 and more particularly 6/1 to 10/1. When this ratio is less than about 4/1, formation of by-products such as dialkylsulfide, dialkyldisulfide, olefin polymers etc. increases. Ratios greater than about 15/1 are not preferred since mercaptan yield is not improved and economics of the process are effected because of reactor and hydrogen sulfide recovery requirements.

The reaction must be effected in liquid phase. Accordingly it is necessary that hydrogen sulfide be maintained always in an excess amount, as above described, in the reaction mixture and is in a liquid state. Otherwise, mercaptans produced in the reaction react with non-reacted olefin to produce by-product alkylsulfides with corresponding decrease in yield of mercaptans. The excess of hydrogen sulfide acts as the solvent for the produced mercaptan and prevents contact of olefin with mercaptan.

The reaction temperature appears to be critical for each peroxyester employed, but in all cases will range between about 50 to 130° C. For example, when using t-butyl-peroxypivalate, the reaction is preferably effected at a temperature between 50 to 80° C. At a temperature of less than 50° C., the decomposition of peroxyester is considerably slower so that it is difficult for the reaction to proceed. Furthermore, at a temperature of more than 130° C., the by-products such as dialkylsulfide, dialkyldisulfide etc. increase.

The pressure, when hydrogen sulfide and olefin are reacted in the presence of the above-described peroxyesters, is one sufficient to liquefy hydrogen sulfide and although the value is influenced by hydrogen sulfide fed and the reaction temperature, it is generally about 20 kg./cm.$^2$ to 120 kg./cm.$^2$.

The reaction time is preferably 2 to 15 hours. In less than 2 hours, the reaction proceeds only slightly and the yield of mercaptan is poor, while at reaction times greater than 15 hours, the yield of by-products increases.

The process for recovering non-reacted hydrogen sulfide utilizes the difference of temperature between the reaction vessel and a bomb employed for recovering hydrogen sulfide. More than 90% of the excess hydrogen sulfide used can be recovered by maintaining the temperature of the recovering bomb 50 to 120° C. preferably 80 to 90° C. lower than that of the reaction vessel. The recovered hydrogen sulfide contains a very small amount of impurities formed by decomposition of peroxide so that is can be recycled and used repeatedly for the reaction as such. Accordingly, when this process is practiced, a special apparatus for recovering hydrogen sulfide is not necessary.

After the reaction is complete and the excess hydrogen sulfide recovered as above described, the reaction products are treated with an amine to decompose any remaining peroxyester, and the mercaptan recovered as by distillation.

The following examples are given in illustration of this invention and are not intended as limitations thereof.

EXAMPLE 1

168 g. of dodecene-1 and 15 g. of t-butyl-peroxypivalate were introduced into a 500 ml. autoclave, which was purged with nitrogen and to which was then added 204 g. of hydrogen sulfide. The resulting mixture was stirred at 60° C. for 5 hours. In this case, the pressure was 30 to 35 kg./cm.$^2$. After completion of the reaction, the stirring was stopped and the reaction vessel at such temperature was connected by a lead pipe with a 300 ml. bomb cooled to 5° C. and the cock of the reaction vessel was opened. Then the temperature of the reaction vessel was raised to 90° C. to transfer hydrogen sulfide from the reaction vessel to the bomb rapidly. 155 g. of hydrogen sulfide, representing 91% of the excess, was recovered. To the reaction product were added 5 g. of ethylenediamine to decompose the non-decomposed peroxyester, and then a distillation was effected to obtain 154 g. of the primary dodecylmercaptan and 30 g. of dodecylsulfide. The yield of mercaptan was 76%.

EXAMPLE 2

In this example the amount of t-butyl-peroxypivalate added was varied. Namely, the reactions were effected in the same manner as described in Example 1, except that t-butyl-peroxypivalate was used in amounts of 5 g. and 10 g. to obtain yields of dodecylmercaptan of 59% and 70% respectively as shown in Table 1. From the result of Table 1, it is apparent that as the amount of t-butyl-peroxypivalate increases, the yield is improved.

TABLE 1

| Amount of t-butyl-peroxypivalate (g.) | Yield of dodecylmercaptan | | Amount of sulfide (g.) | Pressure kg./cm.$^2$ |
|---|---|---|---|---|
| | (G.) | Percent | | |
| 5 | 119 | 59 | 19 | 33–35 |
| 10 | 142 | 70 | 26 | 34–35 |
| 15 | 154 | 76 | 26 | 34–25 |

EXAMPLE 3

In this example the amount of hydrogen sulfide added was varied. Namely, the reaction was effected in the same manner as described in Example 1, except that hydrogen sulfide was used in amounts of 136 g. and 238 g. to obtain yields of dodecylmercaptan of 55% and 76% respectively as shown in Table 2.

TABLE 2

| Amount of hydrogen sulfide (g.) | Yield of dodecylmercaptan | | Amount of sulfide (g.) | Pressure kg./cm.$^2$ |
|---|---|---|---|---|
| | (G.) | Percent | | |
| 136 | 111 | 55 | 25 | 29–30 |
| 204 | 154 | 76 | 26 | 34–35 |
| 238 | 154 | 76 | 24 | 43–45 |

From the above table, it appears preferable to use more than 204 g. of hydrogen sulfide (mole ratio to the olefin of 6).

EXAMPLE 4

In this example the reaction time was varied. Namely, the reaction was effected in the same manner as described in Example 1, except that t-butyl-peroxypivalate was used in an amount of 5 g. and the reaction times were 5, 10 and 15 hours to obtain the yields of dodecylmercaptan of 59, 66 and 59% respectively as shown in Table 3.

TABLE 3

| Reaction time (hr.) | Yield of dodecylmercaptan | | Amount of sulfide (g.) | Pressure, kg./cm.$^2$ |
|---|---|---|---|---|
| | G. | Percent | | |
| 5 | 119 | 59 | 19 | 33–35 |
| 10 | 134 | 66 | 25 | 29–30 |
| 15 | 119 | 59 | 15 | 30–34 |

From the results of Table 3, it appears that at the conditions of Example 3, a reaction time of 10 hours is preferable.

EXAMPLE 5

In this example, the reaction temperature was varied. Namely the reaction was effected in the same manner as described in Example 1, except that t-butyl-peroxypivalate was used in an amount of 5 g. the reaction time was 10 hours and the reaction temperatures were 50, 60, 70, 80 and 100° C. to obtain the yields of dodecylmercaptan of 29, 66, 77, 73 and 68% respectivey as shown in Table 4.

TABLE 4

| Reaction temperature (° C.) | Yield of dodecylmercaptan | | Amount of sulfide (g.) | Pressure, kg./cm.$^2$ |
|---|---|---|---|---|
| | G. | Percent | | |
| 50 | 59 | 29 | 20 | 28–30 |
| 60 | 134 | 66 | 25 | 29–30 |
| 70 | 156 | 77 | 35 | 40–42 |
| 80 | 148 | 73 | 35 | 47–50 |
| 100 | 138 | 68 | 36 | 61–62 |

As seen from the above table, the best result was obtained at the reaction temperature of 70° C.

EXAMPLE 6

168 g. of dodecene-1 and 10 g. of t-butyl-peroxybenzoate were introduced into a 500 ml. autoclave, which was purged with nitrogen and into which was then introduced 204 g. of hydrogen sulfide. The resulting mixture was stirred at a temperature of 90° C., 100° C. and 110° C. for 10 hours. The pressures were 55 kg./cm.$^2$, 62 kg./cm.$^2$ and 86 kg./cm.$^2$ respectively. The yields of the primary dodecylmercaptan were 19, 45 and 31% respectively and the yields of didodecylsulfide were 20, 28 and 31 g. respectively.

EXAMPLE 7

168 g. of dodecene-1 and 10 g. of t-butyl-peroxyacetate were introduced into a 500 ml. of autoclave, which was purged with nitrogen and into which was fed 204 g. of hydrogen sulfide. The resulting mixture was reacted at a temperature of 100° C. for 10 hours. In this case, the pressure was 61 kg./cm.$^2$. The yield of dodecylmercaptan was 41% and didodecylsulfide was 21 g.

EXAMPLE 8

168 g. of dodecene-1 and 10 g. of t-butyl-peroxy-isopropylcarbonate were introduced into a 500 ml. autoclave, which was purged with nitrogen and to which was then fed 204 g. of hydrogen sulfide. The resulting mixture was stirred at 75° C. for 10 hours. The pressure was 45 kg./cm.$^2$. As the result, the yield of the primary dodecylmercaptan was 33% and the yield of didodecylsulfide was 26 g.

EXAMPLE 9

168 g. of dodecene-1 and 10 g. of t-butyl-peroxylaurate were introduced into a 500 ml. autoclave, which was purged with nitrogen and to which was then fed 204 g. of hydrogen sulfide. The resulting mixture was reacted at 95° C. for 10 hours. The pressure was 58 kg./cm.$^2$. The yield of dodecylmercaptan was 35% and the yield of didodecylsulfide was 30 g.

EXAMPLE 10

112 g. of octene-1 and 5 g. of t-butyl-peroxypivalate were introduced into a 500 ml. autoclave, which was purged with nitrogen and to which was then fed 204 g. of hydrogen sulfide. The resulting mixture was reacted at 70° C. for 10 hours. The pressure was 40 kg./cm.$^2$. The yield of the primary octylmercaptan was 70% and the yield of dioctylsulfide was 18 g.

EXAMPLE 11

In this example, the reaction was effected in the same manner as described in Example 10, except that 140 g. of decene-1 were used instead of octene-1 to obtain a yield of the primary decylmercaptan of 72% and a yield of didecylsulfide was 23 g.

EXAMPLE 12

In this example, the reaction was effected in the same manner as described in Example 10, except that diisobutylene was used instead of octene-1 to obtain a yield of the primary and secondary octylmercaptans of 65% and a yield of dioctylsulfide of 20 g.

EXAMPLE 13

The reaction of this example was effected at 70° C. for 9 hours by using 168 g. of dodecene-1, 204 g. of hydrogen sulfide and 7 g. of t-btuyl-peroxypivalate. On completion of the reaction, the non-reacted hydrogen sulfide was recovered in the same manner as described in Example 1 and used in the reaction repeatedly. About 6 mols of fresh hydrogen sulfide were added to each repeat action. The reactions were repeated four times and about 90% of non-reacted hydrogen sulfide was recovered each time. There was no variation in the yield of mercaptan.

dodecene, 1-tetradecene, 1-pentadecene, 1-hexadecene, 1-octadecene and tetracontene.

3. The method according to claim 1 in which the mol ratio of hydrogen sulfide to olefin is about 6/1–10/1.

4. The method according to claim 1 in which said peroxyester is present in an amount of about 2.0–5.0% based on the weight of the olefin.

5. The method according to claim 1 in which the reaction time is 2 to 15 hours.

6. The method according to claim 1 in which the reaction pressure is about 20 kg./cm.$^2$ to 120 kg./cm.$^2$.

7. The method of claim 1 in which said reaction is conducted in a reaction vessel and nonreacted hydrogen sulfide contained therein is recovered therefrom by main-

TABLE 5

| Repeated times | Hydrogen sulfide | | | Amount of fresh H$_2$S added (g.) | Temperature difference in the recovery (° C.) | Yield of mercaptan (percent) |
| --- | --- | --- | --- | --- | --- | --- |
| | Amount used for reaction (g.) | Excess amount (g.) | Recovered amount (g.) | | | |
| 1 | 210 | 176 | 169 | | 85 | 75.6 |
| 2 | 213 | 179 | 163 | 44 | 85 | 74.4 |
| 3 | 207 | 173 | 149 | 44 | 80 | 75.0 |
| 4 | 210 | 176 | 153 | 61 | 85 | 75.9 |

What we claim is:

1. The method of producing a mercaptan which consists essentially of reacting hydrogen sulfide and an aliphatic olefin in an anhydrous liquid phase at a temperature of about 50–130° C. in the presence of a peroxyester having the formula $$R_1-\overset{\overset{\displaystyle O}{\|}}{C}-O-O-R_2$$

in which $R_1$ is a member selected from the group consisting of alkyls of 1–10 carbon atoms and benzyl, and $R_2$ is t-butyl, said peroxyester being present in an amount of about 1.0–10% by weight based on the olefin and said hydrogen sulfide and said olefin are in a mol ratio of about 4/1–15/1; and recovering mercaptan so produced.

2. The method according to claim 1 in which the aliphatic olefin is selected from the group consisting of propylene, pentene, 1-octene, diisobutylene, 1-decene, 1- taining said vessel in communication with a hydrogen sulfide recovery vessel maintained at a temperature of from 50–120° C. below that maintained in said reaction vessel, and recycling to said reaction vessel hydrogen sulfide so recovered.

8. The method according to claim 7 in which the temperature in said recovery vessel is maintained at a temperature of 80–90° C. below that in said reaction vessel.

References Cited

UNITED STATES PATENTS 2,865,965   12/1958   May et al. _____ 260—609
3,045,053   7/1962   Fond _____ 260—609

CHARLES B. PARKER, Primary Examiner

D. R. PHILLIPS, Assistant Examiner

U.S. Cl. X.R.

260—608